United States Patent [19]

Papp

[11] 4,099,540
[45] Jul. 11, 1978

[54] TWO-WAY BYPASS VALVE

[75] Inventor: Louis S. Papp, Chagrin Falls, Ohio

[73] Assignee: Incom International Inc., Pittsburgh, Pa.

[21] Appl. No.: 721,326

[22] Filed: Sep. 7, 1976

[51] Int. Cl.$^2$ ............................................. F16K 17/18
[52] U.S. Cl. .............................. 137/493.8; 137/512.5; 137/516.11; 210/130
[58] Field of Search .................. 137/493, 493.8, 493.9, 137/512, 512.1, 516.11, 516.13, 516.15, 512.5; 188/281, 282; 210/130, 133

[56] References Cited

U.S. PATENT DOCUMENTS

| 1,783,599 | 12/1930 | Blake | 137/512.1 |
| 3,221,880 | 12/1965 | Wilkinson | 137/516.15 X |
| 3,557,957 | 1/1971 | Baldwin | 210/130 |

FOREIGN PATENT DOCUMENTS

| 1,200,624 | 9/1965 | Fed. Rep. of Germany | 137/493.8 |
| 1,936,841 | 2/1971 | Fed. Rep. of Germany | 137/512.5 |

Primary Examiner—Robert G. Nilson
Attorney, Agent, or Firm—James C. Wray

[57] ABSTRACT

A two-way filter bypass valve seat has several holes, in this case four. Two similar valve plates with two holes each are arranged at 90° to each other on opposite sides of the seat so that two holes in each plate align with two of the holes in the seat. A single spring or a spring for each pin is compressed by a keeper which joins the rivets or individual keepers on ends of the rivets in the case of individual springs. The large single keeper is square; rivets extend through opposite corners of the square and remaining corners are bent inward to retain a large spring from lateral displacement. The seat is mounted in a conventional cartridge-type oil filter with a two-way valve across the central screen cylinder so that excessive pressure differential from either side of the valve opens the valve to permit flow, bypassing the filter. The seat extends across the inner screen cylinder to seal the inner cylinder permitting flow only through the valve.

12 Claims, 7 Drawing Figures

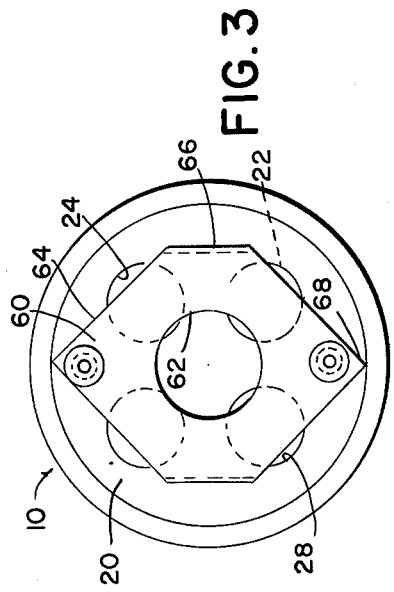

TWO-WAY BYPASS VALVE

BACKGROUND OF THE INVENTION

Examples of pertinent patents which were considered before filing this application are:

Humbert U.S. Pat. No. 3,456,800 describes a two-way valve within the central cylindrical screen of an oil filter. Oil flows longitudinally within the cartridge between the perforated outer shell and the solid outer shell.

Pall U.S. Pat. No. 3,262,567 describes a two-way valve within the central screen cylinder of a filter cartridge, which uses a substantially non-distensible annular frustoconical spring disc as the relief valve.

Pall U.S. Pat. No. 3,262,564 describes a particular bypass arrangement near a filter mount.

Baldwin U.S. Pat. No. 3,557,957 shows a specific two-way valve design.

Baldwin U.S. Pat. Nos. 3,557,958 and 3,608,724 describe and claim relief valves mounted at the head end of the filter to communicate the passageways upon excess pressure.

U.S. Pat. Nos. 3,262,563, 3,272,336, 3,370,708 and 3,146,194 were selected for their general showings of interest.

The remaining patents were selected to show two-way valves to be generally well known in the automotive art. Most of these valves are applicable to radiator cap type devices.

SUMMARY OF THE INVENTION

This invention relates to relief valves in fluid filter elements such as lube oil filters, etc., specifically for fluid flow in either direction, outside-in or inside-out. Unlike other devices of this nature which utilize separate sets of holes and valves, this unique arrangement is considerably simplified. Both valve plates are exactly alike, containing two fluid port holes and two guide pin holes. They are placed on either side of the seat containing four fluid port holes and two guide pin holes, in a criss-cross fashion.

Two guide pins assume other roles, preventing the valve plates from rotating, and serving as a restraint for the pressure spring in one direction. A spring pressure plate restrains the spring in the other direction. Tabs hold the spring centered.

The fluid flows through two holes in an upstream valve plate, through two holes in the seat, and against the blank portion of the down stream plate. When excessive pressure builds up, the down stream plate unseats, allowing fluid to flow around the perimeter of the downstream plate and through its holes.

This arrangement allows for a large volume of fluid flow. It is apparent that the holes can be considerably larger than shown in the drawings and and may be sectoral in shape.

Valve plates are interchangeable, and due to their unique construction, they cannot be misassembled.

An alternate embodiment has two separate springs separately located axially on the guide pins, eliminating the one piece spring pressure plate.

One object of this invention is low cost, since it is part of a relatively inexpensive filter cartridge which will be discarded after serving its useful life.

An object of the invention is the provision of a two-way valve apparatus having a base, a seat connected to the base, the seat having first and second faces and first and second passageway means within the seat for communicating openings in the first face with openings in the second face, first and second valve plates mounted respectively on the first and second faces of the seat, the first valve plate having first plate passageway means communicating with the first seat passageway means for flowing fluid through the first plate passageway means and through the first seat passsageway means, the second valve plate having second plate passageway means communicating with the second seat passageway means for flowing fluid through the second plate passageway means and second seat passageway means and resilient means urging the first and second valve plates into contact with the first and second faces whereby a portion of the first plate overlies the second seat passageway in sealing relationship therewith and whereby a portion of the second plate overlies opening of the first seat passageway in sealing relationship therewith, whereby fluid pressure in the first plate passageway and the first seat passageway tends to move the second plate away from the first seat passageway against sealing pressure of the resilient means, and whereby fluid pressure in the second plate passageway and second seat passageway tends to move the first plate away from the opening of the second seat passageway against sealing pressure of the resilient means.

Another object of the invention is the provision of a two-way valve apparatus having alignment means connected to a seat and to valve plates for aligning the plates with the seat whereby openings of passageways in the plates are aligned with openings of respective passageways in the seat.

A further object of the invention is the provision of a two-way valve apparatus with alignment pin-receiving openings in valve plates and seat and pins extending through the pin receiving openings.

The invention has as another object the provision of a two-way valve apparatus with corresponding passages in two plates and a seat, alignment pins extending through the plates and seat and a retainer on the pins for retaining a spring connected between the retainer and the first plate for urging the first plate away from the retainer means toward the seat.

A further object of the invention is the provision of a two-way valve apparatus as described with heads on second ends of the pins adjacent the second plate on a side of the plate opposite the seat, whereby the spring acting through the retainer and the pins and heads and urges the second plate toward the seat.

The invention has as a further object the provision of two-way valve apparatus with a retainer plate extending across and connected to first ends of alignment pins.

Another object of the invention is the provision of two-way valve apparatus with a square retainer plate having opposite corners connected to first ends of alignment pins and having transverse opposite corners bent in the direction of a first plate to cooperate with the pins in preventing lateral displacement of a spring.

A further object of the invention is the provision of two-way valve apparatus with the retainer means comprising individual retainers on first ends of alignment pins and individual springs mounted on the pins between the retainers and the first valve plate.

The invention has as another object the provision of two-way valve apparatus with similar reversed valve plates and a valve seat which are circular and flat and with parallel abutting faces.

A further object of the invention is the provision of two-way valve apparatus with first seat passageways and first plate passageways which are corresponding evenly spaced passages extending through the first plate and seat and with second seat passageways and second plate passageway which are equal plural evenly spaced passageways with second seat passageways interposed between first seat passageways.

A further object of the invention is the provision of two-way valve apparatus with first and second plates and a seat which are circular, with the center of the plates and seat being solid and with passageways disposed radially about the plates and seat.

These and further objects and features of the invention are apparent in the disclosure which includes the above and ongoing specification with the claims and the drawings.

BRIEF DESCRIPTION OF THE DRAWINGS

FIG. 1 is a sectional side elevation of the two-way valve of the invention.

FIG. 2 is an end elevation of the two-way valve shown in FIG. 1 showing the valve base, a peripheral area of the valve seat, the second valve plate and heads of pins and revealing small circular blocking portions of the first valve plate through aligned passageways in the second valve plate and in the valve seat.

FIG. 3 is an end elevation of the two-way valve shown in FIGS. 1 and 2, showing the spring retainer and the first valve plate.

FIG. 4 is a detail of the valve seat.

FIG. 5 is a detail of the first valve plate which is identical to the second valve plate.

FIG. 7 is a sectional side elevation of a modified two-way valve using the valve plate and seat similar to FIG. 1, but using individual springs and retainers.

DETAILED DESCRIPTION OF THE DRAWINGS

Figure 6:
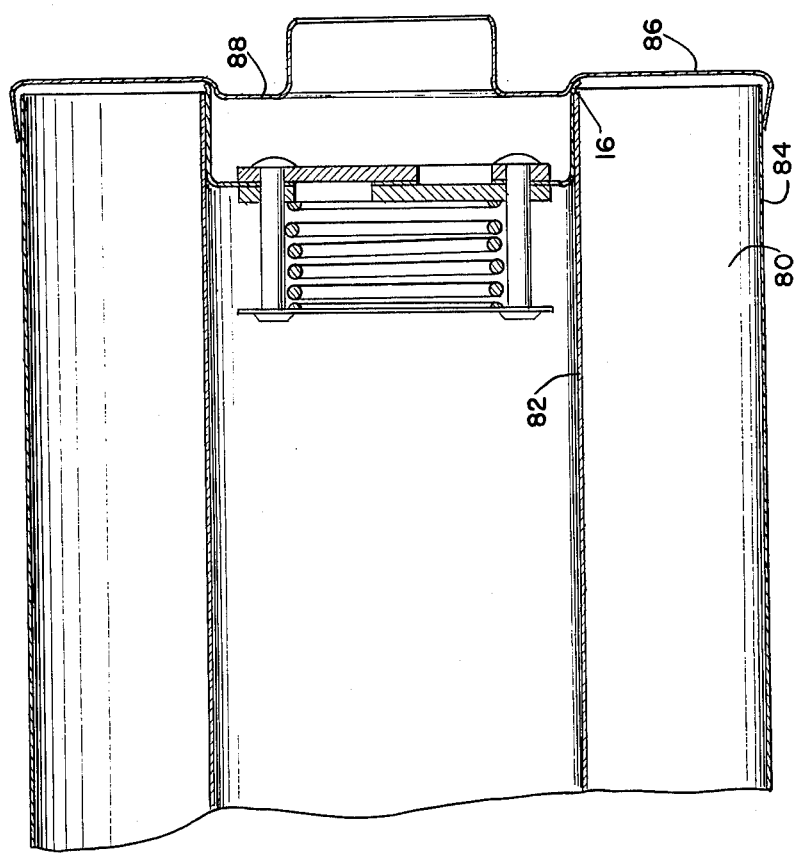
FIG. 6 is a detail showing assembly of the valve of FIG. 1 in a filter.

Referring to FIG. 1, a two-way valve apparatus is generally indicated by the numeral 10. A base 12 of the valve includes a cylindrical portion 14 which is integrally formed with a flat seat 15, having first and second opposite faces. The cylindrical wall 14 terminates outwardly in an outward extended lip 16 and a circular rim 18 which are used for mounting the two-way valve in a passageway to relieve excess pressure in either direction in the passageway.

As best seen with reference to FIG. 4, the seat 15 of valve body 12 has a first flat face 20. The opposite second flat face of seat 15 which faces second valve plate 30 may be seen with reference to FIG. 1.

The valve seat 15 has a plurality of evenly spaced, radially distributed passageways 22, 24, 26 and 28. Passageways 24 and 28 form a first seat passageway means which cooperate with corresponding first plate passageway means in first valve plate 40. Passageways 22 and 26 form second seat passageway means which align and cooperate with passageways in the second valve plate 30. Holes 29 in seat 15 receive pins 70 as later will be described and permit sliding of the pins through the holes Referring to FIGS. 1 and 2, it is seen that a first valve plate 40 is mounted on the valve seat 15 opposite the second valve plate 30. The second valve plate 30 has a plurality of passageways 32 and 36 which align respectively with passageways 22 and 26 in seat 15. Portions 42 and 46 of valve plate 40 block passageways 32 and 36 as shown in FIG. 2. Portions 34 and 38 of second plate 30 block passageways 44 and 48 as shown in FIGS. 3 and 5 of the drawings.

Referring to FIG. 1, it can be seen that holes 39 in second valve plate 30 are aligned with holes 29 in seat 15 and holes 49 in first plate 40 to slidably receive pins 70.

A resilient means 50 which is a coil spring, has a first end 52 which presses against valve plate 40 and has a second end 54 which presses against retainer 60.

As best seen with reference to FIGS. 1 and 3, retainer 60 has a central opening 62 and square side edges 64 through and by which fluid passes.

Corners 66 are bent in the direction of first plate 40 to cooperate with pins 70 in holding the spring 50 centered in the assembly against lateral displacement. Corners 68 of the retainer 60 are provided with holes 69 to receive first ends 74 of pins 70. Heads 72 of the pins rest against second valve plates 30, and the ends 74 of the pins 70 are upset to complete the assembly.

As shown in FIG. 6, a filter cartridge 80 has an inner cylindrical screen 82 and an outer cylindrical screen 84. A cap 86 with a central depression 88 surrounding an opening is placed on the end of the filter, trapping lip 16 between the end of central cylindrical screen 82 and the cap 86, and holding the two-way valve base firmly in position in the filter.

As shown in FIG. 7, the single spring 50 may be replaced by two springs 90 and individual retainers 92 at the ends of pins 70.

In operation, excess pressure from the direction of base 12 flows through passages 32 and 36 in the first plate which are aligned with passages 22 and 26 in the seat, urging the first plate 40 to compress spring 50; that allows the continued flow of fluid around the circumference of plate 40 and through its passages 44 and 48.

Excess pressure on the side of the valve near the retainer 60 flows through openings 44 and 48 in valve plate 40 which are aligned with openings 24 and 28 in the seat and presses against areas 34 and 38 of the second valve plate 30. When the pressure is sufficient, the second valve plate, bearing against heads 72 of pins 70, slides the pins through aligned openings 29, 39 and 49, drawing the retainer 60 toward the first plate 40 and compressing spring 50. Fluid flows around the circumference of second plate 30 between the circular edge and the cylindrical wall 14 of the base, and fluid flows through openings 32 and 36 in the second valve plate.

While the invention has been described with reference to specific embodiments, modifications and variations of the invention may be made without departing from the nature and scope of the invention. The scope of the invention is defined in the following claims.

I claim:

1. Two-way valve apparatus having a base, a seat connected to the base, the seat having first and second faces and first and second passageway means within the seat for communicating openings in the first face with openings in the second face, first and second valve plates mounted respectively on the first and second faces of the seat, the first valve plate having first plate passageway means communicating with the first seat passageway means for flowing fluid through the first plate passageway means and through the first seat passageway means, the second valve plate having second plate passageway means communicating with the second seat passageway means for flowing fluid through the second plate passageway means and second seat passageway means and resilient means urging the first and second valve plates into contact with the first and second faces whereby a portion of the first plate overlies the second seat passageway in sealing relationship therewith and whereby a portion of the second plate overlies opening of the first seat passageway in sealing relationship therewith, whereby fluid pressure in the first plate passageway and the first seat passageway tends to move the second plate away from the first seat passageway against sealing pressure of the resilient means, and whereby fluid pressure in the second plate passageway and second seat passageway tends to move the first plate away from the opening of the second seat passageway against sealing pressure of the resilient means, alignment means connected to the base and to the plates for aligning the plates with the seat whereby openings of passageways in the plates are aligned with openings of respective passageways in the seat, wherein the alignment means comprise pin-receiving openings in the plates and seat and pins extending through the pin-receiving openings.

2. The two-way valve apparatus of claim 1 wherein the resilient means comprises retainer means connected to first ends of the pins for retaining spring means and spring means connected between the retainer means and the first plate for urging the first plate away from the retainer means toward the seat.

3. The two-way valve apparatus of claim 2 further comprising heads on second ends of the pins adjacent the second plate on a side of the plate opposite the seat, whereby the spring means acting through the retainer means and the pins and heads urges the second plate toward the seat.

4. The apparatus of claim 2 wherein the retainer means comprises a retainer plate extending across first ends of the pins and connected to first ends of the pins.

5. The two-way valve apparatus of claim 4 wherein the resilient means comprises a single spring compressed between the retainer plate and the first valve plate.

6. The two-way valve apparatus of claim 5 wherein the pins are two in number, and wherein the retainer plate is a square plate having opposite corners connected to first ends of the pins and having transverse opposite corners bent in the direction of the first plate, whereby the bent corners and the pins cooperate in preventing lateral displacement of the spring.

7. The two-way valve apparatus of claim 2 wherein the retainer means comprise individual retainers on first ends of the pins and wherein the spring means comprise individual springs mounted on the pins between the retainers and the first valve plate.

8. The two-way valve apparatus of claim 1 wherein the pins comprise first and second pins at opposite portions of the plates and seats.

9. The two-way valve apparatus of claim 1 wherein the valve plates and valve seat are rigid, circular and are flat and wherein the first and second faces of the valve seat are parallel.

10. The apparatus of claim 9 wherein the base extends outward from the seat beyond the plates and turns in the direction of one of the plates in the form of a generally cylindrical wall.

11. The two-way valve apparatus of claim 9 wherein the first seat passageway means and first plate passageway means are correspondingly evenly spaced passages extending through the first plate and seat and wherein the second seat passageway means and second plate passageway means are equal plural evenly spaced passageways interposed between passageways of the first passageway means.

12. The two-way valve apparatus of claim 11 wherein the first and second plates and the seat are circular and wherein the center of the plates and seat are solid and wherein the passageways are disposed radially about the plates and seat.

* * * * *